United States Patent [19]

Oonishi et al.

[11] Patent Number: 4,871,819

[45] Date of Patent: Oct. 3, 1989

[54] ETHYLENE COPOLYMER AND PROCESS FOR THE PRODUCTION THEREOF

[75] Inventors: Akiyoshi Oonishi; Iwao Ishino; Takeo Shimada; Yuji Ozeki, all of Mie, Japan

[73] Assignee: Mitsubishi Petrochemical Co., Ltd., Tokyo, Japan

[21] Appl. No.: 749,798

[22] Filed: Jun. 28, 1985

[30] Foreign Application Priority Data

Jul. 9, 1984 [JP] Japan .................................. 59-141776

[51] Int. Cl.$^4$ ..................... C08F 259/02; C08F 259/08
[52] U.S. Cl. .................................. 526/245; 526/292.5
[58] Field of Search ............................... 526/292.5, 245

[56] References Cited

U.S. PATENT DOCUMENTS 3,210,326 10/1965 Tousignant ...................... 526/292.5
4,211,730 7/1980 Vollkommer ..................... 526/292.5

Primary Examiner—Paul R. Michl
Assistant Examiner—C. D. RoDee

Attorney, Agent, or Firm—Oblon, Spivak, McClelland, Maier & Neustadt

[57] ABSTRACT

A copolymer of ethylene and an ethylenically $\alpha,\beta$-unsaturated acid halogenated phenyl ester represented by the formula (1):

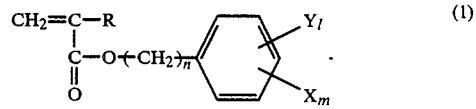

(wherein R is hydrogen or a methyl group, X is a halogen atom, Y is an alkyl group having 4 to 18 carbon atoms, n is 0 or 1, m is an integer of 1 to 5, and l is 0 or an integer of 1 to 4), wherein the halogenated phenyl ester group unit content is about 0.005 to about 10 mol %. This copolymer is excellent in dielectric breakdown characteristics and flexibility, and its excellent performance can be maintained over a long period of time. Thus, it is useful as a superhigh voltage electric wire cable insulative material.

5 Claims, 2 Drawing Sheets

ETHYLENE COPOLYMER AND PROCESS FOR THE PRODUCTION THEREOF

FIELD OF THE INVENTION

The present invention relates to an ethylene copolymer having excellent dielectric breakdown characteristics at superhigh voltages and a process for the production of the ethylene copolymer.

BACKGROUND OF THE INVENTION

Cross-linked polyethylene derived from low density polyethylene is widely used as a CV cable (cross-linked polyethylene insulated vinyl jacket power cable) insulative material because it is excellent in electric characteristics and heat resistance. However, it has a disadvantage in that dielectric breakdown occurs at superhigh voltages. It has therefore been desired to develop a material exhibiting more improved characteristics Various attempts have been made to improve the dielectric breakdown characteristics at superhigh voltages, for example, as described in T. Fukada et al., I.E.E.E., E117 (5), (1982).

If there are impurities such as voids, water and metal, electric charges are concentrated to the impurities, thereby causing a reduction in the dielectric breakdown characteristics. For this reason, investigations have been directed mainly to the technique of removing such impurities. Thus, a clean polyethylene not containing impurities having a size of 250 μm or more and a dry cross-linking method not producing voids have been developed. These techniques are described, for example, in M. Takaoka, I.E.E.E., Trans. Power Appar. Syst., 102 (9), 3254–3263 (1983). If, however, a 275 kv cable is produced by these conventional methods, the thickness of the cable insulative material reaches several centimeters. It is, therefore, necessary for the cable insulative material to have more improved dielectric breakdown characteristics.

Another attempt is to add a voltage stabilizer (e.g., calcium stearate, polystyrene and aromatic compounds) to the cable insulative material so as to provide it with a capability to prevent the concentration of electric charges, as described, for example, in U.S. Pat. No. 3,346,500 and 3,350,312. The reason for this is that if the cable insulative material possesses a capability to prevent the concentration of electric charges by itself, the thickness of the cable insulative material can be decreased. The addition of such an additive, however, suffers from a disadvantage that the additive bleeds out and the performance of the cable cannot be maintained over a long period of time.

In recent years investigations have been extended to other materials such as high density polyethylene, polypropylene and polystyrene, as described, for example, in K. Kaminaga et al., Proceeding of the 17th Symp. on Electrical Insulating Materials, p-7, 193 (1984) Japan. Since, however, the cable is coil-like wound, it is required for the cable insulative material to have flexibility. If, therefore, the above materials are used, it is necessary to provide flexibility to them. In resins produced by coordinate anionic polymerization, such as high density polyethylene and polypropylene, catalyst residues such as Ti and Al remain unremoved although their amounts are small, and there is a danger that they become sites for the concentration of electric charges.

SUMMARY OF THE INVENTION

An object of the present invention is to provide an ethylene copolymer which is excellent in dielectric breakdown characteristics and flexibility, can maintain its performance over long periods of time, and in which any metallic catalyst residues do not remain unremoved.

Another object of the present invention is to provide a process for producing such ethylene copolymers.

The present invention, in one embodiment, relates to an ethylene copolymer obtained by copolymerization of ethylene and an ethylenically $\alpha,\beta$-unsaturated acid halogenated phenyl ester as represented by the formula (1):

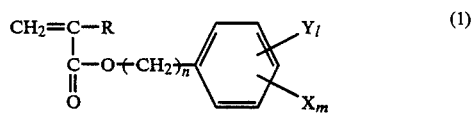

(wherein R is hydrogen or a methyl group, X is fluorine, chlorine, bromine, or iodine, Y is an alkyl group having 4 to 18 carbon atoms, n is 0 or 1, m is an integer of 1 to 5, and l is 0 or an integer of 1 to 4), wherein the halogenated phenyl ester group unit content is about 0.005 to about 10 mol % based on the total amount of the ethylene copolymer.

In another embodiment, the present invention relates to a process for producing an ethylene copolymer which comprises copolymerizing ethylene and about 0.005 to about 10 mol % (based on the total amount of the ethylene copolymer) of an ethylenically $\alpha,\beta$-unsaturated acid halogenated phenyl ester of the formula (1) as described above under the conditions of temperature of about 120° C. or more and pressure of about 500 kg/cm² or more by the use of a free radical group releasing initiator.

DETAILED DESCRIPTION OF THE INVENTION

Figure 1:
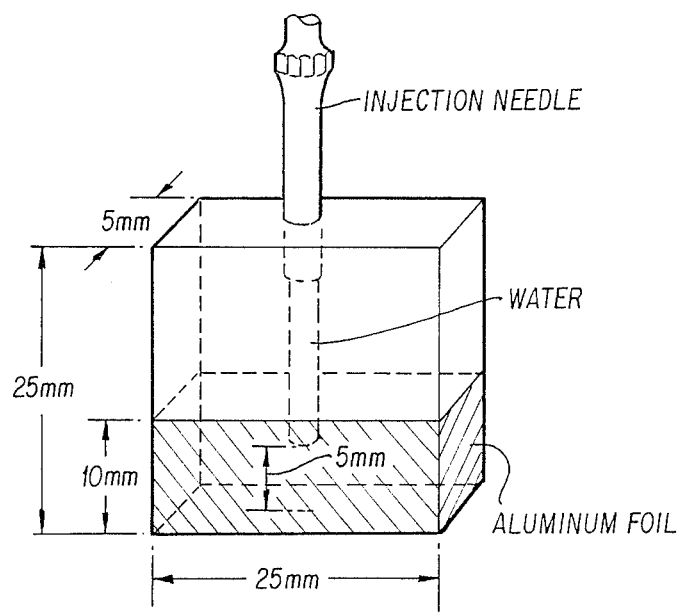
FIG. 1 is a schematic view of a specimen for measurement of water treeing property

The ethylene copolymer of the present invention is a copolymer obtained by copolymerization of ethylene and at least one ethylenically $\alpha,\beta$-unsaturated halogenated phenyl ester as represented by the formula (1) as described above.

In the formula (1), R is hydrogen or a methyl group, X is fluorine, chlorine, bromine or iodine, Y is an alkyl group having 4 to 18 carbon atoms, preferably 6 to 18 carbon atoms, n is 0 or 1, m is an integer of 1 to 5, preferably 3 to 5, and l is 0 or an integer of 1 to 4.

Typical examples of the ethylenically $\alpha,\beta$-unsaturated acid halogenated phenyl ester of the formula (1) as described above are shown below.

Brominated phenyl esters of acrylic or methacrylic acid, such as pentabromophenyl acrylate or methacrylate, tribromophenyl acrylate or methacrylate, dibromophenyl acrylate or methacrylate, dibromononylphenyl acrylate or methacrylate, dibromostearylphenyl acrylate or methacrylate, acrylate, and monobromononylphenyl acrylate or methacrylate;

Brominated benzyl esters of acrylic or methacrylic acid;

Chlorinated phenyl esters of acrylic or methacrylic acid;

Chlorinated benzyl esters of acrylic or methacrylic acid;

Iodinated phenyl esters of acrylic or methacrylic acid;

Iodinated benzyl esters of acrylic or methacrylic acid;

Fluorinated phenyl esters of acrylic or methacrylic acid; and

Fluorinated benzyl esters of acrylic or methacrylic acid.

The ethylenically $\alpha,\beta$-unsaturated acid halogenated phenyl ester unit content of the ethylene copolymer of the present invention is about 0.005 to about 10 mol % and preferably about 0.05 to about 5 mol % (based on the total amount of the ethylene copolymer).

There are no special limitations to the structure of ethylene copolymer of the present invention. Preferably the ethylene copolymer of the present invention is a random copolymer or a graft copolymer comprising an ethylene polymer as a main chain and unsaturated acid halogenated phenyl ester groups grafted thereonto.

In addition to the ethylene and ethylenically $\beta,\beta$-unsaturated acid halogenated phenyl ester, the ethylene copolymer of the present invention may contain another monomer for the modification (for example, the changes in adhesion property, flexibility or etc.) thereof. In this case, the modification monomer content is about 10 mol % or less. As the modification monomer, monomers copolymerizable with ethylene can be used. Typical examples of such monomers are vinyl esters such as vinyl acetate and vinyl propionate, acrylic acid esters such as ethyl acrylate, methyl acrylate, and butyl acrylate, methacrylic acid esters such as methyl methacrylate, ethyl methacrylate, and butyl methacrylate, and ethylenically $\alpha,\beta$-unsaturated acids such as acrylic acid and methacrylic acid.

The number average molecular weight of the ethylene copolymer of the present invention is at least about 1,000 (generally about 1,000 to about 100,000). If the number average molecular weight is less than about 1,000, the resulting ethylene copolymer cannot maintain its performance over long periods of time. Preferably the molecular weight is more than about 3,000 to about 50,000.

The ethylene copolymer of the present invention is a very unique polymer excellent in dielectric breakdown characteristics and exhibiting good flame retardance. Thus, it can find numerous uses For example, the ethylene copolymer can be used as an electric wire cable insulative material by application of extrusion molding, or it can be used as an insulative film or flame retardant film by molding into a film form by the T-die flat film processing or blown film processing.

In addition, the ethylene copolymer of the present invention can be molded into various articles by techniques such as blow molding, injection molding, and extrusion molding. As a typical embodiment of extrusion molding, the ethylene copolymer of the present invention can be extrusion coated on a film made of another plastics or a material other than the plastics (e.g., a metallic foil, paper and cloth) to produce a laminated film.

The ethylene copolymer of the present invention belongs to the group of thermoplastic resins. Therefore, it can be used as blends with other thermoplastic resins commonly used for such resins, such as polyethylene, polypropylene, an ethylene/vinyl acetate copolymer, an ethylene/ethylacrylate copolymer and an ethylene/methylacrylate copolymer. Moreover, a petroleum resin, a wax, a stabilizer, an antistatic agent, an ultraviolet absorbent, a synthetic or natural rubber, a lubricant, an inorganic filler, and the like can be compounded to the ethylene copolymer of the present invention.

The ethylene copolymer of the present invention can be used as a cross-linked product by employing a chemical cross-linking agent, or by irradiating with electron rays, or by graft copolymerizing with vinyl trimethoxysilane, for example.

The process of production of the ethylene copolymer of the present invention will hereinafter be explained.

In the production of the ethylene copolymer of the present invention, an apparatus for the production of high pressure polyethylene can be employed.

The ethylene copolymer of the present invention is produced by radical polymerization. Therefore, as the catalyst for use in the production of the ethylene copolymer of the present invention, free radical group releasing compounds are used. Typical examples of such compounds are shown below.

Oxygen, dialkyl peroxides such as di-tert-butyl peroxide, tert-butyl cumyl peroxide, and dicumyl peroxide; diacyl peroxides such as acetyl peroxide, isobutyl peroxide, and octanoyl peroxide; peroxy dicarbonates such as diisopropyl peroxy dicarbonate, and di-2-ethylhexyl peroxy dicarbonate; peroxy esters such as tertbutyl peroxy isobutyrate, tert-butyl peroxy pivalate, and tert-butyl peroxy laurate; ketone peroxides such as methyl ethyl ketone peroxide, and cyclohexanone peroxide; peroxy ketals such as 1,1-bis-tert-butyl peroxy cyclohexane, and 2,2-bis-tert-butyl peroxy octane; hydroperoxides such as tert-butyl hydroperoxide, and cumene hydroperoxide; and azo compounds such as 2,2-azobisisobutyronitrile.

The polymerization is preferably carried out continuously. As the polymerization apparatus, as described above, a reactor commonly used in high pressure radical polymerization of ethylene, such as a continuous stirring type vessel reactor or a continuous tubular reactor, can be used.

The polymerization can be carried out in a single reaction zone using a single reactor. In addition, the polymerization can be carried out in a plurality of reactors connected in series and, in some cases, with coolers connected thereto, or in a single reactor the inside of which is divided into a plurality of zones. In the multizone polymerization, reaction conditions such as a monomer composition, a catalyst concentration, and a molecular weight controller concentration in each zone or reactor are usually adjusted to control the characteristics of the polymer obtained in each zone or reactor. In the case that a plurality of reactors are connected in series, in addition to a combination of two or more vessel reactors and a combination of two or more tubular reactors, a combination of at least one vessel reactor and at least one tubular reactor can be employed.

The polymer produced in one or more reactors is separated from unreacted monomers and then can be processed in the same manner as in the production of the usual high pressure polyethylene. A mixture of unreacted monomers is mixed with supplementary fresh monomers and, after increasing its pressure, returned to the reactor. The composition of such supplementary fresh monomers is such as to make the resulting composition equal to the original feed composition. In general, the supplementary fresh monomers have a composition nearly equivalent with that of the polymer separated from the reactor. As the reactor, a vessel reactor is preferred in that an ethylene copolymer having a uniform composition can be obtained.

The catalyst is usually dissolved in a solvent having a small chain transfer effect and injected directly into the reactor by means of a high pressure pump. The concentration of the catalyst is preferably about 0.5 to about 30 wt %.

Suitable examples of the solvent are hexane, heptane, white spirit, hydrocarbon oils, such as gasoline, kerosene, gas oil, or etc., cyclohexane, toluene, higher branched saturated fatty acid hydrocarbons, and mixtures thereof.

The ethylenically $\alpha,\beta$-unsaturated acid halogenated phenyl ester represented by the formula (1) as described above is solid at ordinary temperature and, therefore, it is dissolved in a solvent having a small chain transfer effect and injected directly into the reactor by means of a high pressure pump. The ethylenically $\alpha,\beta$-unsaturated acid halogenated phenyl ester is insoluble in nonpolar solvents such as hexane and cyclohexane. Although it is soluble in methyl ethyl ketone, carbon tetrachloride, and methylene chloride, the chain transfer effect of these solvents is undesirably large. Thus, the choice of the solvent is significant in the present invention.

It has been found according to the present invention that aromatic compounds such as ethyl benzoate, toluene and methyl benzoate are suitable for the above purpose because their chain transfer effect is small and their capability to dissolve the ethylenically $\alpha,\beta$-unsaturated acid halogenated phenyl ester is great. When the ethylenically $\alpha,\beta$-unsaturated acid halogenated phenyl ester is dissolved in such solvents, its concentration is about 1 to about 60 wt% and preferably about 2 to about 15 wt %.

In the high pressure radical polymerization, a chain transfer agent is generally, except for special cases, used in order to control the molecular weight of the resulting polymer. As the chain transfer agent, all compounds commonly used in the high pressure radical polymerization can be used.

Typical examples of the chain transfer agent are alkanes such as ethane, propane, butane, hexane and heptane; alkenes such as propylene, butene and hexene; alcohols such as ethanol, methanol and propanol; ketones such as acetone and methyl ethyl ketone; and aldehydes such as acetaldehyde and propionaldehyde. In addition, many compounds used in the high pressure radical polymerization can be used.

Gaseous ingredients are injected into an inlet of a compressor, whereas liquid ingredients are injected into the reaction system by means of a pump.

The polymerization pressure is in excess of about 500 kg/cm$^2$ and preferably about 1,000 to about 4,000 kg/cm$^2$.

The polymerization temperature is about 120° C. or more and preferably about 150 to about 300° C.

The ethylene copolymer of the present invention is separated from monomers in a separator according to the usual procedure for the high pressure radical polymerization, and used as a product as it is.

Although the ethylene copolymer product can be used as it is, it may be subjected to various post treatments commonly applied to the product as obtained by the usual high pressure radical polymerization.

The present invention is described in greater detail with reference to the following examples.

The properties for the evaluation of the ethylene copolymer of the present invention were measured according to the following methods.

(1) Molecular weight: Measured by the gel permeation chromatographic method.

(2) Comonomer content: Measured by the NMR method.

(3) MFR (melt flow rate): Measured by JIS K6760.

(4) Density: Measured by JIS K6760.

(5) DC breakdown relative value: Measured by ASTM 3755.

(6) Impulse breakdown relative value (Imp breakdown value): Measured by ASTM D3426.

(7) Inflammability: Measured by UL 94.

(8) Gel fraction: Measured by JIS C3005.

(9) Water treeing property: Measured according to the following method. That is, a test piece having a size of 25 mm×25 mm×5 mm was cut from a sheet which had been pressure-molded under the conditions of 160° C. and 150 kg/cm$^2$ so as to have a thickness of 5 mm. This test piece was vertically placed on a plain surface such that one of the surfaces of the test piece having an area of 5 mm×25 mm contact the surface of the bed of the testing machine. After an injection needle having a diameter of 1 mm was injected into the test piece from the top surface of the test piece in a depth of 20 mm, it was drawn out by 15 mm while injecting distilled water into the pore being produced by the injection and withdrawal of the needle, and then an aluminum foil having a width of 10 mm was affixed around the side surfaces of the test piece so that the bottom region of side surface of the test piece was covered at a height of 10 mm to obtain a specimen as shown in FIG. 1. After applying an alternating current of 60 Hz and 10 kv to the specimen (between the needle and the foil) for 50 hours, an average length of water tree which grew was measured by a microscope.

EXAMPLE 1

32 kg/hr of ethylene (E), 540 ml/hr of a toluene solution of pentabromophenyl methacrylate (PBPM) (proportion: 100 g of pentabromophenyl methacrylate per liter of toluene), 20 l/hr of propylene, and 400 ml/hr of an n-hexane solution of tert-butyl peroxy isobutyrate as a catalyst (proportion: 5 g of tert-butyl peroxy isobutyrate per liter of n-hexane) were continuously fed to a 1.5 liter stirring autoclave type continuous reactor and polymerization was conducted under the conditions of temperature of 220° C. and pressure of 2,600 kg/cm$^2$ to produce an ethylene copolymer (E/PBPM).

Figure 2:
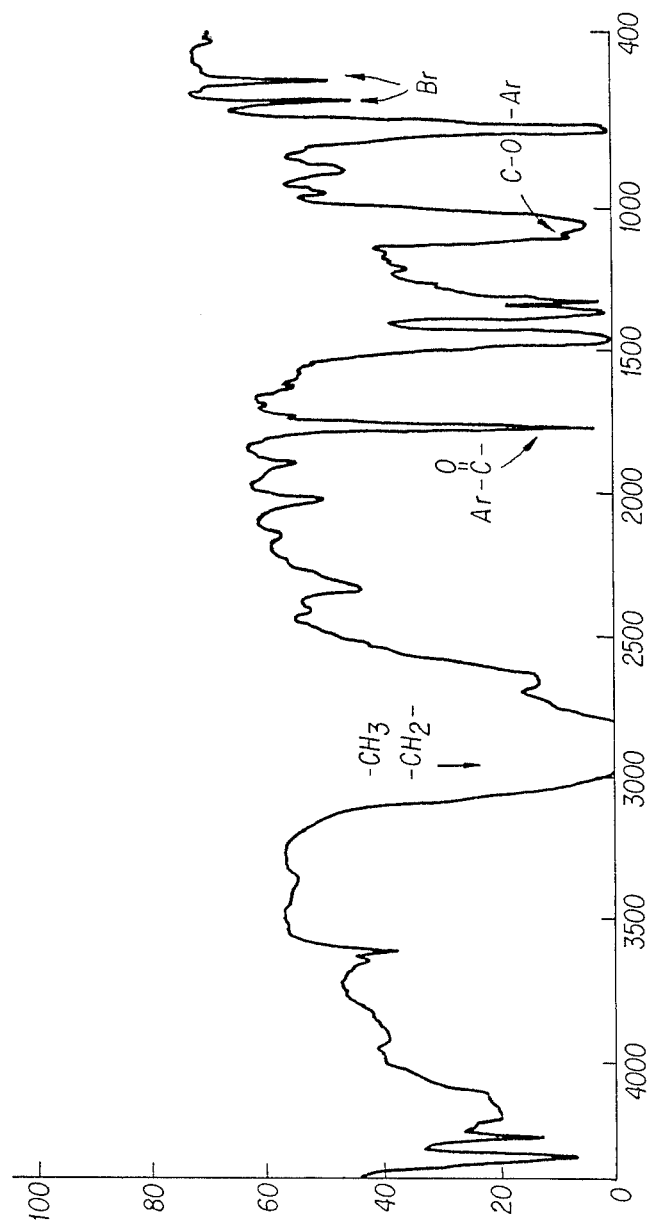
FIG. 2 is an infrared spectrum of a copolymer produced in Example 1.

For the ethylene copolymer thus produced, MFR=2.3 g/10 min, and the pentabromophenyl methacrylate content was 0.05 mol %. The infrared spectrum of the ethylene copolymer is shown in FIG. 2.

The electric characteristics of the ethylene copolymer are shown in Table 1 along with those of comparative copolymers.

EXAMPLE 2

In this example, the amount of pentabromophenyl methacrylate (PBPM) added was changed.

32 kg/hr of ethylene (E), 1.2 l/hr of a toluene solution of pentabromophenyl methacrylate (proportion: 500 g of pentabromophenyl methacrylate per liter of toluene), 12 l/hr of propylene, and 320 ml/hr of the same catalyst as used in Example 1 were continuously fed to the same reactor as used in Example 1 and polymerization was conducted under the conditions of temperature of 218° C. and pressure of 2,600 kg/cm² to produce an ethylene copolymer (E/PBPM).

For the ethylene copolymer thus produced, MFR=5.8 g/10 min, and the pentabromophenyl methacrylate content was 0.6 mol %.

The electric characteristics of the ethylene copolymer are shown in Table 1.

EXAMPLE 3

In this example, tribromophenyl methacrylate (TBPM) was used in place of pentabromophenyl methacrylate used in Example 1.

32 kg/hr of ethylene (E), 450 ml/hr of a toluene solution of tribromophenyl methacrylate (proportion: 300 g of tribromophenyl methacrylate per liter of toluene) were fed, and polymerization was conducted under the conditions of temperature of 223° C. and pressure of 2,600 kg/cm² to produce an ethylene copolymer (E/TBPM).

For the ethylene copolymer thus produced, MFR=3.6 g/10 min, and the tribromophenyl methacrylate content was 0.12 mol %.

The electric characteristics of the ethylene copolymer are shown in Table 1.

COMPARATIVE EXAMPLE

The electric characteristics of commercially available high pressure-produced polyethylene (LDPE) (i.e., "Yukalon YF-30" (MFR=1.0 g/10 min), registered trademark of Mitsubishi Petrochemical Co., Ltd.); HDPE (i.e., "Yukalon Hard EZ-40", registered trademark of Mitsubishi Petrochemical Co., Ltd.); and polypropylene (i.e., "Mitsubishi Novlen BC-8", registered trademark of Mitsubishi Petrochemical Co., Ltd.) are shown in Table 1.

EXAMPLE 4

In Example 1, dibromononylphenyl methacrylate (DBNPMA) was used in place of pentabromophenyl methacrylate.

30 kg/hr of ethylene (E) and 900 ml/hr of a toluene solution of dibromononylphenyl methacrylate (proportion: 100 g of dibromononylphenyl methacrylate per liter of oluene) were fed, and polymerization was conducted under the conditions of temperature of 220° C. and pressure of 2,600 kg/cm² to produce an ethylene copolymer (E/DBNPMA).

For the ethylene copolymer thus produced, MFR=3 g/10 min, and the dibromononylphenyl methacrylate content was 0.07 mol %.

The electric characteristics of the ethylene copolymer are shown in Table 1.

EXAMPLE 5

In this example, the same reactor as used in Example 4 was used, the amount of dibromononylphenyl methacrylate (DBNPMA) added was changed and propylene was not used.

32 kg/hr of ethylene (E), 9.7 l/hr of a toluene solution of dibromononylphenyl methacrylate (proportion: 100 g of dibromononylphenyl methacrylate per liter of toluene), and 850 ml/hr of the same catalyst as used in Example 1 were continuously fed, and polymerization was conducted under the conditions of temperature of 218° C. and pressure of 2,600 kg/cm² to produce an ethylene copolymer.

For the ethylene copolymer thus produced, MFR=4 g/10 min, and the dibromononylphenyl methacrylate content was 0.75 mol %.

The characteristics of the ethylene copolymer are shown in Table 1.

TABLE 1

| | Example 1 E/PBPM | Example 2 E/PBPM | Example 3 E/TBPM | Comparative Example 1 LDPE (YF-30) | Comparative Example 2 HDPE (EZ-40) | Comparative Example 3 PN (BC-8) | Example 4 E/DBNPMA | Example 5 E/DPNPMA |
|---|---|---|---|---|---|---|---|---|
| MFG (g/10 min) | 2.3 | 5.8 | 3.6 | 1.0 | 1.0 | 1.1 | 3 | 4 |
| Density (g/cm³) | 0.930 | 0.936 | 0.932 | 0.920 | 0.950 | 0.901 | 0.928 | 0.930 |
| Melting Point (°C.) | 113 | 116 | 114 | 110 | 132 | 153 | 112 | 110 |
| DC Breakdown Value (MV/cm) | | | | | | | | |
| 30° C. | 6.8 | 7.5 | 7.2 | 5.8 | 6.4 | 7.0 | 6.9 | 7.3 |
| 90° C. | 4.8 | 5.2 | 4.9 | 3.2 | 3.8 | 4.0 | 4.7 | 5.0 |
| Imp Breakdown Value (MV/cm) | | | | | | | | |
| 30° C. | 7.0 | 7.8 | 7.0 | 5.4 | 6.5 | 6.8 | 7.2 | 7.8 |
| 90° C. | 5.6 | 6.2 | 5.8 | 4.7 | 5.2 | 5.2 | 5.8 | 5.3 |
| Water Treeing Property (mm) | 0.008 | 0.006 | 0.008 | 0.07 | 0.02 | 0.02 | 0.005 | 0.002 |

While the invention has bee described in detail and with reference to specific embodiments thereof, it will be apparent to one skilled in the art that various changes and modifications can be made therein without departing from the spirit and scope thereof.

What is claimed is:

1. An ethylene copolymer for use as electrical insulation derived from ethylene and an ethylenically $\alpha,\beta$-unsaturated acid halogenated phenyl ester represented by the formula (1):

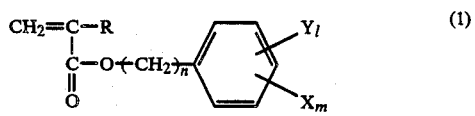

(wherein R is hydrogen or a methyl group, X is fluorine, chlorine, bromine, or iodine, Y is an alkyl group having 4 to 18 carbon atoms, n is 0 or 1, m is an integer of 1 to 5, and l is 0 or an integer of 1 to 4), wherein the halogenated phenyl ester group unit content is about 0.005 to about 10 mol %.

2. The ethylene copolymer as claimed in claim 1, wherein in the general formula (1), m is an integer of 3 to 5.

3. A process for producing an ethylene copolymer which comprises copolymerizing ethylene and about 0.005 to about 10 mol % (based on the total amount) of an ethylenically α,β-unsaturated acid halogenated phenyl ester at a temperature of about 120° C. or more and a pressure of about 500 kg/cm² or more by the use of a free radical group releasing initiator.

4. The process as claimed in claim 3, wherein the polymerization is carried out in a vessel type reactor.

5. An electrical conductor insulated with a material comprising a copolymer of ethylene and an unsaturated monomer having the formula:

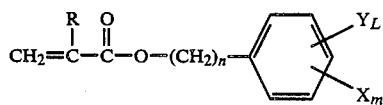

wherein R is hydrogen or a methyl group, X is fluorine, chlorine, bromine, or iodine, Y is an alkyl group having 5 to 18 carbon atoms, n is 0 or 1, m is an integer of 1 to 5, and L is 0 or an integer or 1 to 4 and wherein the halogenated phenyl ester group unit content is about 0.005 to about 10 mol %.

* * * * *